(12) United States Patent
Ohbitsu

(10) Patent No.: US 8,280,759 B2
(45) Date of Patent: Oct. 2, 2012

(54) INFORMATION SYSTEM, SERVER, AND SERVICE PROVIDING METHOD

(75) Inventor: Toshiro Ohbitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 386 days.

(21) Appl. No.: 12/552,536

(22) Filed: Sep. 2, 2009

(65) Prior Publication Data

US 2010/0094779 A1 Apr. 15, 2010

(30) Foreign Application Priority Data

Oct. 10, 2008 (JP) .................................. 2008-264184

(51) Int. Cl.
*G06Q 10/00* (2012.01)
*G06F 17/00* (2006.01)
*G06G 7/00* (2006.01)

(52) U.S. Cl. ...................................... 705/7.35; 705/400

(58) Field of Classification Search .................... None
See application file for complete search history.

(56) References Cited

U.S. PATENT DOCUMENTS

| | | | |
|---|---|---|---|
| 6,768,287 | B2 | 7/2004 | Oosaki |
| 2002/0188562 | A1 | 12/2002 | Igarashi |
| 2003/0169019 | A1 | 9/2003 | Oosaki |
| 2004/0266391 | A1* | 12/2004 | Hafren ........................... 455/405 |
| 2006/0039469 | A1* | 2/2006 | Leibbrandt .............. 375/240.08 |

FOREIGN PATENT DOCUMENTS

| | | |
|---|---|---|
| EP | 1265397 | 12/2002 |
| EP | 1642414 | 1/2005 |
| JP | 11-69017 | 3/1999 |
| JP | 2002-164838 | 6/2002 |
| JP | 2002-314711 | 10/2002 |
| JP | 2003-50761 | 2/2003 |
| JP | 2003-256084 | 9/2003 |
| JP | 2003-338829 | 11/2003 |
| JP | 2005-11282 | 1/2005 |
| JP | 2007-527134 | 9/2007 |
| KR | 10-0554769 | 2/2006 |

OTHER PUBLICATIONS

Yu Shuan et al., "An energy efficient middleware for supporting multimedia services in mobile grid enviroments", proceedings of the international conference on information technology: coding and computing, Apr. 2005.*

Korean Office Action issued Mar. 9, 2011 in corresponding Korean Patent Application 10-2009-0091232.

* cited by examiner

*Primary Examiner* — John Hayes
*Assistant Examiner* — George Chen
(74) *Attorney, Agent, or Firm* — Staas & Halsey LLP

(57) ABSTRACT

Fee-charging unit has unit to exclude, from a fee-charging target, information that is provided for a period of non-operating time for which the receiving device is presumed, from at least the charging state, to be disabled from continuing the reception if the fee-charging target information was provided to the receiving device in the past, if there is not recorded a piece of information that the receiving device can continue to receive the information for the predetermined period of time and if there is recorded a piece of information that the charging state of the secondary battery is not sufficient for continuing the reception.

13 Claims, 13 Drawing Sheets

FIG. 13

```
INDIVIDUAL ID: AAAA
PW: BBBB
CONTENT INFORMATION ID: CCCC
REPRODUCING TIME: DD MIN
POWER SOURCE STATE: EE%
SELECTION COUNT: WW COUNT
```

```
INDIVIDUAL ID: FFFF
PW: GGGG
CONTENT INFORMATION ID: HHHH
REPRODUCING TIME: JJ MIN
POWER SOURCE STATE: KK%
SELECTION COUNT: XX COUNT
```

```
INDIVIDUAL ID: LLL
PW: MMMM
CONTENT INFORMATION ID: NNNN
REPRODUCING TIME: PP MIN
POWER SOURCE STATE: QQ%
SELECTION COUNT: YY COUNT
```

```
INDIVIDUAL ID: RRRR
PW: SSSS
CONTENT INFORMATION ID: TTTT
REPRODUCING TIME: UU MIN
POWER SOURCE STATE: VV%
SELECTION COUNT: ZZ COUNT
```

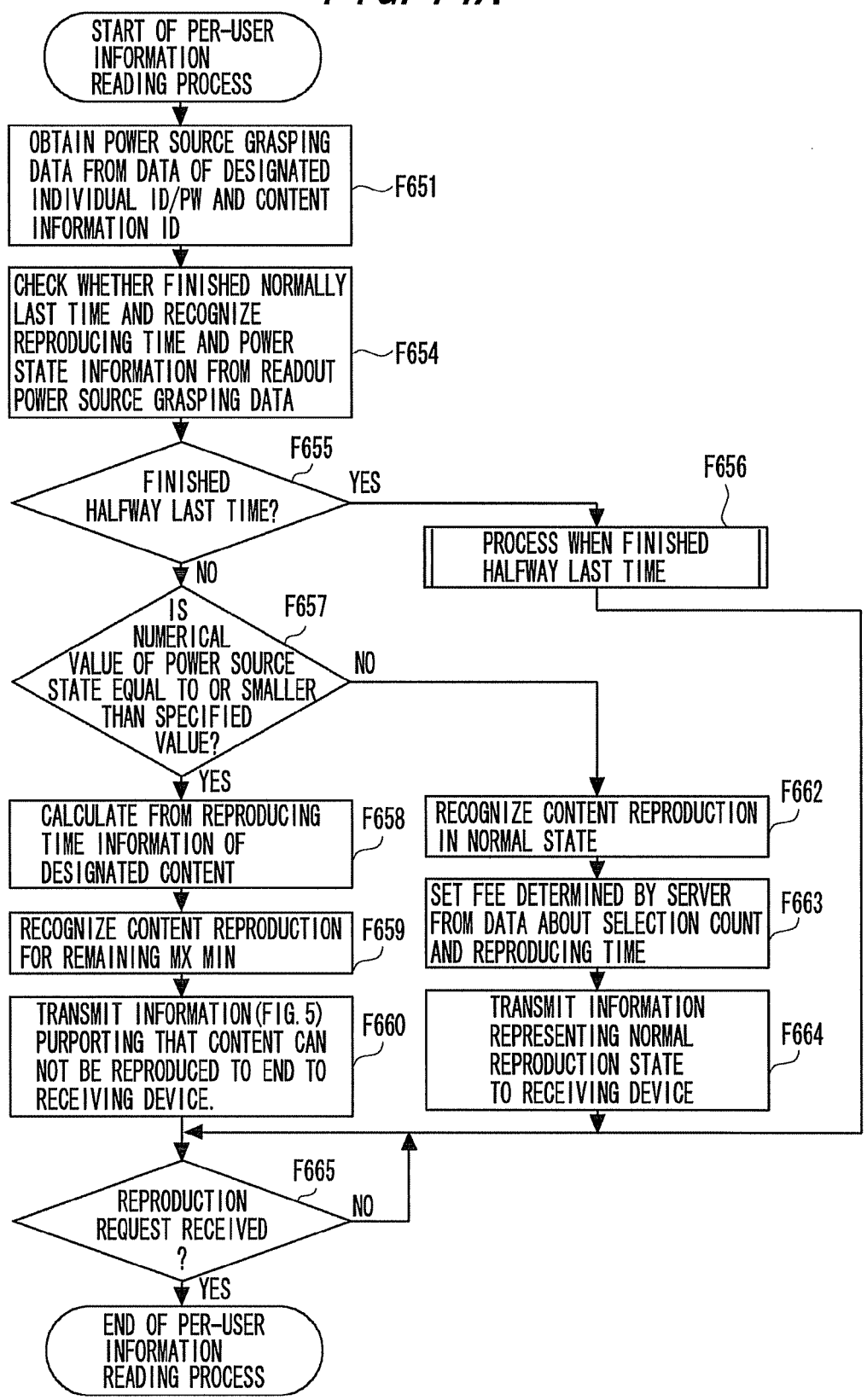

INFORMATION SYSTEM, SERVER, AND SERVICE PROVIDING METHOD

CROSS-REFERENCE TO RELATED APPLICATIONS

This application is based upon and claims the benefit of priority of the prior Japanese Patent Application No. 2008-264184, filed on Oct. 10, 2008, the entire contents which are incorporated herein by reference.

FIELD

This case relates to a technology of providing information in a way that charges a receiving device with a fee on a time basis.

BACKGROUND

It has been practiced that information is distributed continuously for a predetermined period of time as in the case of stream distribution etc to a multi-function device such as a battery-operable personal computer (which will hereinafter be abbreviated to a PC).

The stream distribution is that a server side (which will hereinafter be referred to as a transmitting side) has, e.g., a moving picture content such as pictures in the form of data and distributes the information such as the moving picture content to the PC continuously for the predetermined period of time. The PC side (which will hereinafter be referred to as a receiving side) reproduces the distributed information while receiving the information. This type of reproduction of the moving picture content is called stream reproduction. If the stream reproduction target moving picture content is charged with a fee, a fee-charging process is executed for the stream reproduction (or the stream distribution).

[Patent document 1] Japanese Patent Laid-Open Publication No. 2005-011282
[Patent document 2] Japanese Patent Laid-Open Publication No. 2003-256084
[Patent document 3] Japanese Patent Laid-Open Publication No. 2003-338829
[Patent document 4] Japanese Patent Laid-Open Publication No. 2002-164838
[Patent document 5] Japanese Unexamined Patent Publication No. 2007-527134
[Patent document 6] Japanese Patent Laid-Open Publication No. H11-69017
[Patent document 7] Japanese Patent Laid-Open Publication No. 2002-314711
[Patent document 8] Japanese Patent Laid-Open Publication No. 2003-050761

SUMMARY

According to an aspect of the embodiment, a server includes a server connected via a network to a receiving device driven by a secondary battery and providing a service to the receiving device. The server comprises: receiving unit to receive the charging state of the secondary battery from the receiving device; providing unit to provide the information continuously for the predetermined period of time to the receiving device; fee-charging unit to accumulate fee-charging information for providing the information together with information for identifying the receiving device; estimating unit to estimate, based on the charging state of the secondary battery, a period of operating time for which the receiving device can operate continuously from a start of receiving the information; and recording unit to record information representing that the receiving device can continue the reception for the predetermined period of time.

Then, the fee-charging unit comprises unit to exclude, from a fee-charging target, information that is provided for a period of non-operating time for which the receiving device is presumed, from at least the charging state, to be disabled from continuing the reception if the fee-charging target information was provided to the receiving device in the past, if there is not recorded a piece of information that the receiving device can continue to receive the information for the predetermined period of time and if there is recorded a piece of information that the charging state of the secondary battery is not sufficient for continuing the reception.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 13 is a diagram of an example of power source grasping data.
FIG. 14A is a flowchart illustrating details of a power source grasping data reading process.

DESCRIPTION OF EMBODIMENTS

Figure 1:
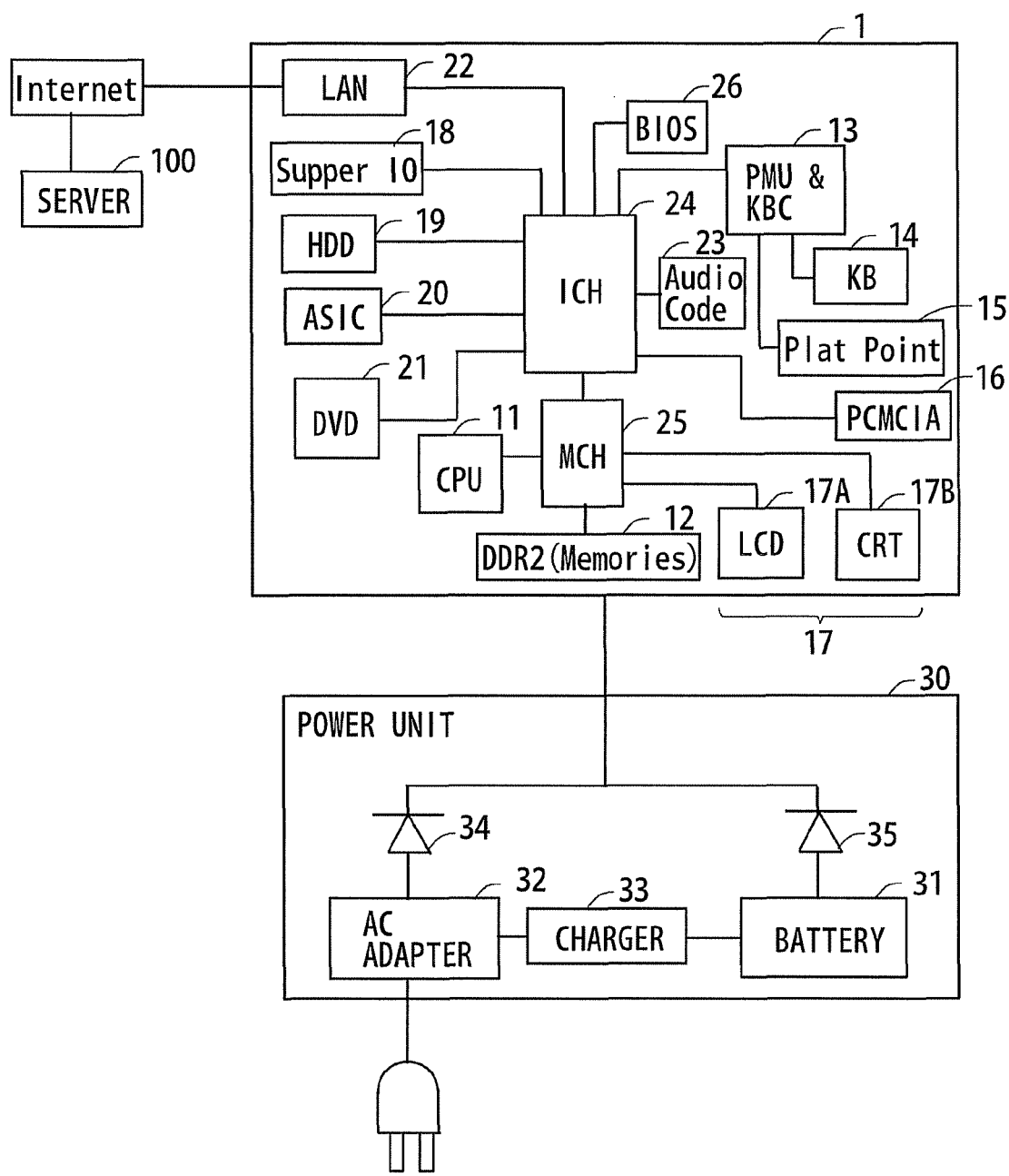
FIG. 1 is a diagram illustrating a hardware architecture of an information system.

An information system according to one embodiment of a disclosed technology will hereinafter be described with reference to the drawings. A configuration in the following embodiment is an exemplification, and this case is not limited to the configuration in the embodiment.

The information system includes a server which distributes information to a receiving device continuously for a predetermined period of time, and the receiving device provided with the information. A phrase "distributing the information to the receiving device continuously for the predetermined period of time" connotes "distributing a stream content containing, e.g., moving pictures or voices/sounds". Further, a phrase "stream reproduction" connotes that the receiving device, to which the server distributes the stream content, reproduces this stream content. For example, in the stream reproduction of a fee-charging content on which a fee is imposed, the receiving side (receiving device) performs the stream reproduction while notifying the transmission side (server) of information about a period of reproducing time and a status of a power source.

A characteristic of the present information system is that the receiving device, when having an access to and gives a stream content reproducing request to the server, notifies the server of a battery charging state (residual power) of the receiving device. The server retains the reproducing time needed for reproducing the stream content, and estimates a period of residual operating time for which the receiving device is enabled to operate continuously from the present point of time in that battery charging state. Then, the reproducing time, the residual operating time and the receiving device are recorded in a database in the way of being associated with each other. Subsequently, after recording a start of reproducing the stream content (e.g., after setting ON a reproduction start flag), the reproduction is started for the receiving device.

The receiving device, if the receiving device could normally receive the stream content to the end, notifies the server of this purport. The server, in the case of obtaining from the receiving device the notification that the receiving device could normally receive the stream content, records a normal end. For example, the server sets OFF the reproduction start flag. Alternatively, the server sets ON a distribution normal end flag. Accordingly, if unable to obtain from the receiving device the notification that the receiving device could normally receive the stream content, it follows that this purport is recorded.

Then, when the receiving device gives the same stream content reproducing request to the server next time, the server searches through the database and thus determines whether or not there is any record that the receiving device reproduced the same stream content in the past. Then, if there is the record that the receiving device reproduced the stream content in the past but if not ended despite the start of the reproduction, the server decides that the reproduction was not yet completed to the end last time. Moreover, at this time, the server may compare the residual operating time with the reproducing time of the stream reproduction based on the battery state of the receiving device when reproducing the stream last time. Then, if a cause of being unable to complete the reproduction to the end last time lies in the battery state of the receiving device, the server executes the reproduction without any charge this time. In this case also, in the same way as done last time, the battery state of the receiving device is acquired from the receiving device, and the reproducing time and the residual operating time of the receiving device are recorded. Further, then, after recording the start of reproducing the stream content (e.g., after setting ON the reproduction start flag), the reproduction is started for the receiving device.

These procedures being taken, the battery state is previously acquired before distributing the content, thereby enabling such a situation to be avoided that the stream content is inevitably reproduced plural number of times due to a malicious intent of the user of the receiving device. For instance, a thinkable scheme is that just before the end of reproducing the stream content, the notification that the stream content could be normally received to the end is cut off by breaking the power source of the receiving device. Before starting the distribution, however, an in-advance grasp of the battery state of the receiving device enables determination about whether this state is actually derived from the battery of the receiving device or from another cause. Then, the server again performs the stream reproduction without any charge for the receiving device which could not normally receive the stream content to the end, whereby the provision of the fee-charging service when reproduced last time can be accomplished.

Specifically, ahead of the stream distribution, the receiving device transmits the power source information to the server. The power source information represents a residual quantity of the battery (e.g., a charging state (%) to a terminal voltage or a full-charge). The server estimates a period of continuously-operable-time of the receiving device from the power source information representing the residual quantity of the battery. Then, the server compares the continuously-operable-time with the reproduction time needed for the stream reproduction. Subsequently, the server displays, in the middle of reproducing the reproduction target stream content by the receiving device having the battery residual quantity described above, an alarm screen if unable to reproduce the content to the last. In this case, the receiving device does not intentionally interrupt, and hence no fee is charged for reproducing again the same content next time. Thus, a first characteristic of the information system is that the server recognizes the battery state of the receiving device and gets the receiving device to display the alarm. Moreover, in this case, a second characteristic of the information system is that the same receiving device, when reproducing the same content next time, is not again charged with any fee.

In the information system, the power source information is transmitted to the server from the receiving device. Hence, a timer is not required for the reproduction. A preferable server in the embodiment is such a type of server that a manufacturer/distributor (maker) of the receiving device manages the user, or alternatively a server of an organization capable of acquiring items of information on a configuration, an environment, etc. of the receiving device employed by the user from the server of the maker described above. This is because if the configuration, the environment, etc of the receiving device have already been acquired and when the receiving device having this device configuration is driven in the present state (in the full charge state of the secondary battery) of the power source, the continuously-operable-time can be thereafter estimated by obtaining the power source information from the receiving device.

When the receiving device is driven by the battery, however, it might happen that the operation abruptly stops due to the battery state. The cut-off of the power source on the receiving side depends on the residual quantity of the battery, and it is presumed that the power source is cut off before executing a process of notifying the server of interruption information from the receiving device.

Therefore, supportability can not be attained simply by transmitting the interruption information to the server from the application of the receiving device. Such being the case, the information system enables the server to decide, from the power source information of the receiving device that is obtained from the receiving device, not that the receiving device is interrupted with an intentional operation but that the stream is stopped. With this scheme, the stream distribution can be performed without charging again the fee with respect to the unintentional stop of the stream reproduction on the receiving side. Then, if the power source of the receiving device is cut off when the server executes the charging process, a record of the not-yet-completed stream distribution remains together with the power source information which has already been acquired in advance. As a result, it is feasible to avoid charging again the fee for distributing the same content next time.

<Configuration>

FIG. 1 illustrates a diagram of a hardware configuration of the information system. As in FIG. 1, the information system includes a receiving device 1 and a server 100. FIG. 1 depicts in detail particularly the hardware configuration of the receiving device 1. The receiving device 1 is exemplified by a portable (hand-held) personal computer, a mobile information terminal (which is also referred to as a PDA (Personal Digital Assistant)), a mobile phone, a PHS (Personal Handyphone System), a portable TV receiver, and so on.

As in FIG. 1, the receiving device 1 includes a CPU 11, a memory 12, a ROM (Read Only Memory) 26 stored with a BIOS (Basic Input/Output System), a display device 17 (an LCD (Liquid Crystal Display) 17A or CRT (Cathode Ray Tube) 17B), a power manager keyboard controller 13, a keyboard 14, a pointing device (e.g., flat points) 15, a PCMCIA (Personal Computer Memory Card International Association) card 16, a LAN (Local Area Network) card 22, a super IO chip 18, a hard disk drive 20, an attachable/detachable storage medium input/output device (e.g., a DVD (Digital Versatile Disc) drive) 21, an I/O interface 24 and a memory interface 25 which connect these components to each other, and a power unit 30. Constructions and functions of these computer components are broadly known, and hence in-depth descriptions thereof are omitted, however, outlines thereof are given as below.

The memory 12 retains a computer program developed in such a format as to be executable by the CPU 11. The CPU 11 executes the computer program on the memory 12, and controls the respective units of the receiving device 1, thus realizing the functions of the receiving device 1. For example, the CPU 11 accesses the server 100 on the Internet via the LAN card 22, and requests the server 100 to distribute the stream content. Then, the CPU 11 reproduces data of the stream content acquired from the server 100 on the internet via the LAN card 22, and outputs, e.g., the moving pictures, the voices, the sounds, etc from the display device 17 or an unillustrated loudspeaker. The display device 17 or the loudspeaker corresponds to an output device.

The power unit 30 includes a battery 31 and an AC adaptor 32. The battery 31 and the AC adaptor 32 include a pair of diodes 34, 35. The battery 31 and the AC adaptor 32 are connected via a face-to-face circuit including the pair of diodes to an output terminal of the power unit 30. With this configuration, the face-to-face circuit supplies the electric power to the receiving device 1 from the battery 31 or the AC adaptor 32, which has the higher voltage. Accordingly, when the AC adaptor 32 is connected to a commercial AC power source, generally the AC adaptor 32 has the higher output voltage than that of the battery 31 and therefore supplies the power to the receiving device 1. At this time, the AC adaptor 32 charges the battery 31 with the electricity through the charging circuit 33. The charge is stopped when the voltage of the battery 31 reaches a specified value. On the other hand, if the AC adaptor 32 is not connected to the commercial AC power source, the battery 31 supplies the power to the receiving device 1.

A detailed description of the server 100 is omitted, however, its configuration is the same as the receiving device 1 has. For instance, the server 100 also includes the CPU, the memory, the hard disk drive, the attachable/detachable storage medium I/O device, the interface with the LAN, etc.

Figure 2:
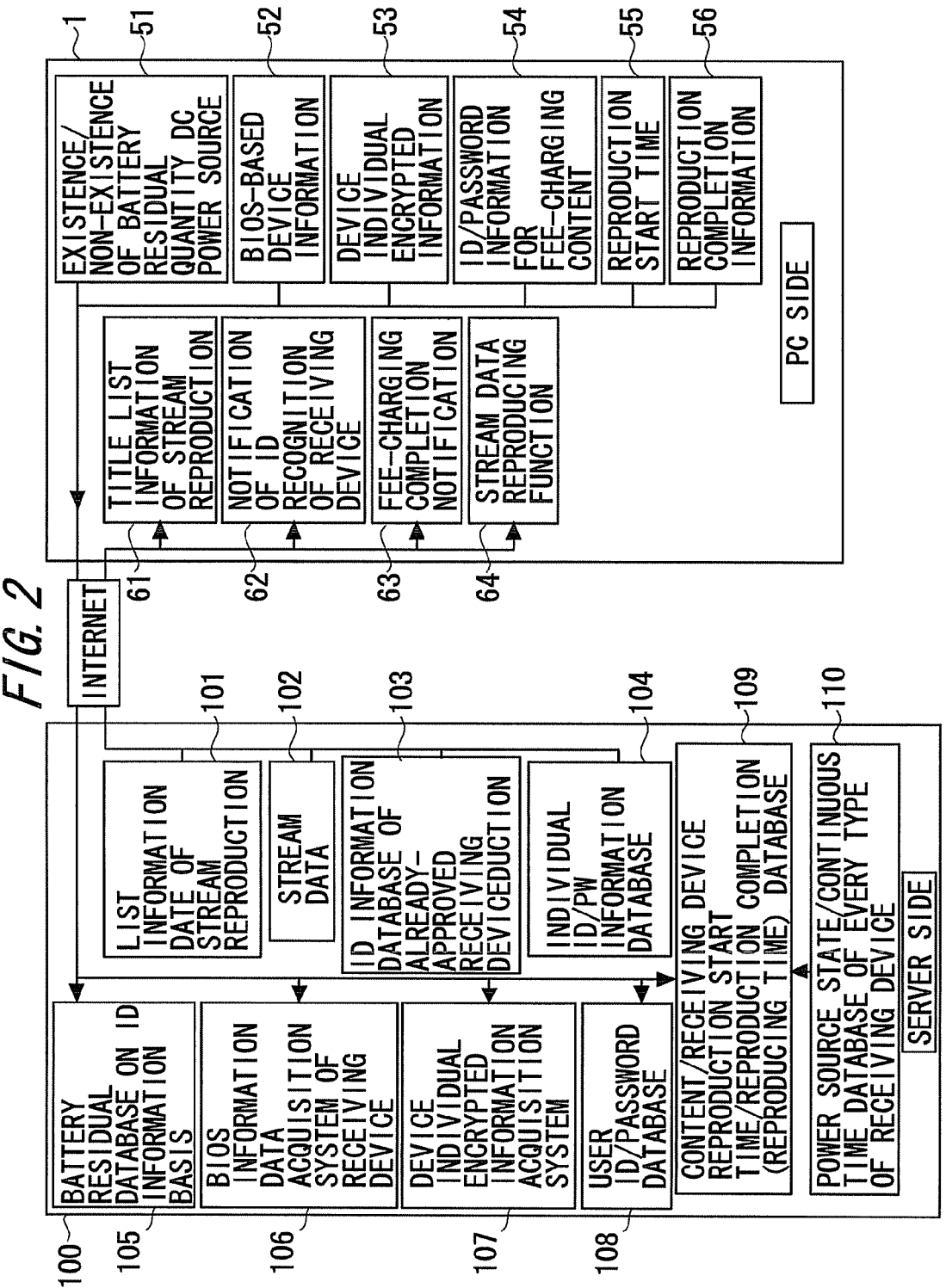
FIG. 2 is a diagram illustrating a functional configuration of the information system.

FIG. 2 illustrates a functional configuration of the information system. As already explained in FIG. 1, the information system includes the server 100 which distributes the information and the receiving device 1 performing the communications with the server 100 via the Internet. As depicted in FIG. 2, the server 100 includes list information data 101 of the stream reproduction, stream data 102, an ID information database 103 of the already-approved receiving device, an individual ID/PW (Identification/Password) information database 104, a battery residual database 105 on an ID information basis, a BIOS information data acquisition system 106 of the receiving device, a device individual encrypted information acquisition system 107, a user ID/password database 108, a content/receiving device reproduction start time/reproduction completion (reproducing time) database 109, and a power source state/continuous time database 110 for every type of receiving device.

Herein, the list information data 101 of the stream reproduction is defined as title list information of the stream reproduction target contents that can be provided by the server 100. This list information is written up at a Web site on the Internet and provided to the receiving device 1. The stream data 102 is the reproduction target content itself. The stream data is not, however, necessarily required to be stored in the server 100 but may be stored in one other server on the Internet. In this case, it may be sufficient that the server 100 obtains a storage destination of the stream content associated with each title of the list information data 101 of the stream reproduction. Then, it may suffice that the server 100 acquires the stream content from the server as the storage destination and distributes the stream content to the receiving device 1. Further, the server as the storage destination may also be requested to distribute the stream content designated by the receiving device 1 to this receiving device 1.

The ID information database 103 of the already-approved receiving device is stored with, for example, the ID of the receiving device 1 of every user registered in the server 100 in response to an application given from the user. The server 100 determines, based on the ID of the receiving device 1, whether the receiving device 1 making the stream reproduction request is a valid product or not.

The individual ID/PW information database 104 is stored with an individual ID and a password of the user receiving the stream reproduction service from the server 100. The server 100 determines, based on the individual ID and the password, whether the user of the receiving device 1 making the stream reproduction request is an authorized user or not.

The battery residual database 105 on the ID information basis is recorded with the battery residual quantity according to every individual ID of the user of the receiving device 1. The battery residual quantity is recorded when starting the stream reproduction and at an interval of a predetermined period of time during the stream reproduction.

The BIOS information data acquisition system 106 of the receiving device, when each receiving device 1 makes the request for the stream reproduction and accesses the server 100, acquires the ID information (stored in the ROM 26) managed by the BIOS from the receiving device 1. Further, the BIOS information data acquisition system 106 of the receiving device may also acquire the ID information recorded on the hard disk.

The device individual encrypted information acquisition system 107 hands over a decryption key corresponding to an encryption key for encrypting the content to the receiving device 1 when handing over the content, which is stream-reproduced, to the receiving device 1. The receiving device 1 decrypts the content to be stream-reproduced with the decryption key handed over from the server 100. The decryption key may also, however, be the same as the encryption key.

The user ID/password database 108 is recorded with a credit card number and a password used for being charged with the fee on a user-by-user basis (for every individual user ID).

The content/receiving device reproduction start time/reproduction completion (reproducing time) database 109 is recorded with, for every individual ID/password of the user, a content information ID for identifying the content that was stream-reproduced in the past, reproduction start time thereof, information (a completion-of-reproduction flag) representing the completion of the reproduction and the reproducing time thereof. This item of data is called power source grasping data. The completion-of-reproduction flag is recorded upon receiving a piece of completion-of-reproduction notification from the receiving device 1. Accordingly, if the completion-of-reproduction notification is not received, the completion-of-reproduction flag is not set up, which implies that the reproduction is not completed. Note that the reproduction start flag may be set up when starting the reproduction and cleared when completing the reproduction.

The power source state/continuous time database 110 for every type of the receiving device is recorded with a relationship between the power source state (e.g., the ratio to the terminal voltage or the full charge of battery) of every type of the receiving device and the continuous time. For example, when letting Ni % ((i)=1, ..., k) be the full charge state of the battery and Ti be the continuation-enabled time of the receiving device in this full charge state, a table including a tuple of (Ni, Ti) may be retained for every type of the receiving device 1. The continuation-enabled time Ti with respect to each Ni enables the power consumption to be determined and calculated from the configuration of the receiving device 1. Further, for instance, empirically, with respect to each battery state Ni, the continuation-enabled time Ti for every type of the receiving device 1 may also be measured. Moreover, the relationship between the battery state Ni and the continuation-enabled time Ti for every type of the receiving device 1 may be obtained in an empirical formula such as T=F(N). F is defined as, e.g., a polynomial of N. Then, it may be sufficient that the CPU 11, when obtaining the power source state N from the receiving device 1, calculates the continuation-enabled time Ti for every type of the receiving device 1 from this empirical formula. Thus, the server 100 can, when obtaining the power source information from the receiving device 1 on the basis of the power source state/continuous time database 110 for every type of the receiving device 1, estimate the continuously-operable-time after the power source state specified by the power source information. The CPU of the server 100, which executes this process, corresponds to estimating unit to estimate the operating time.

Note that if the reproduction is not completed, a period of time till the battery residual quantity reaches "LowBatt" (or the battery residual quantity is assumed to reach "LowBatt") since the start of the reproduction, is estimated as the reproducing time. In this case, the server 100, when receiving a request for the stream reproduction (of the content) specified by the same content information ID from the same receiving device 1 next time, performs the stream reproduction, free of charge, of the frames that originally is stream-reproduced after the reproducing time. The frames that originally is stream-reproduced are the frames distributed after the battery residual quantity has reached "LowBatt" (or the battery residual quantity has been assumed to reach "LowBatt"). Note that "LowBatt" represents a low voltage state in which the receiving device 1, it is considered difficult, continues to operate.

Moreover, the receiving device 1 includes title list information 61 of the stream reproduction, receiving device ID recognizing notification 62, completion of fee-charging notification 63, a stream data reproducing function 64 (corresponding to unit to output the information to an output device), battery residual quantity DC power source existing/non-existing information 51, BIOS-based device information 52, device individual encrypted information 53 stored as a file, ID/password information 54 for a fee-charging content, reproduction start time 55 and completion-of-reproduction information 56.

Herein, the title list information 61 of the stream reproduction is a title list of the contents to be stream-reproduced, which are acquired from the server 100. The receiving device ID recognizing notification 62 is a piece of notification issued from the server 100 in order to confirm that the server 100 recognizes the ID of the receiving device 1. The completion of fee-charging notification 63 is a piece of notification given to the receiving device 1 from the server 100 and representing a completion of charging the fee for the stream reproduction.

The stream data reproducing function 64 is a function of the receiving device 1, which reproduces the stream content received from the server 100. This function is realized by, e.g. a computer program executed by the CPU. The stream data reproducing function 64 may also be, however, realized by use of, e.g., a dedicated-to-signal-processing circuit (e.g., a sum-of-product arithmetic circuit). The stream data reproducing function 64 may further be actualized by a combination of the computer program and the signal processing circuit.

The battery residual quantity DC power source existing/non-existing information 51 is information representing a ratio to the present terminal voltage or the full charge of the battery of the receiving device 1. The BIOS-based device information 52 is ID information etc of the receiving device 1, which is managed by the BIOS and stored in the ROM (Read Only Memory) 26.

The device individual encrypted information 53 stored as the file is defined as a decryption key for decrypting the stream content supplied from the server 100. The ID/password information 54 for the fee-charging content is defined as an individual ID and a password that are used when the user of the receiving device 1 accesses the server 100.

The reproduction start time 55 is the reproduction start time of the stream reproduction that was or is in the middle of the execution last time or at the present. The completion-of-reproduction information 56 is information representing whether the reproduction is completed or not when performing the stream reproduction last time.

<Processing Example>

Figure 3:
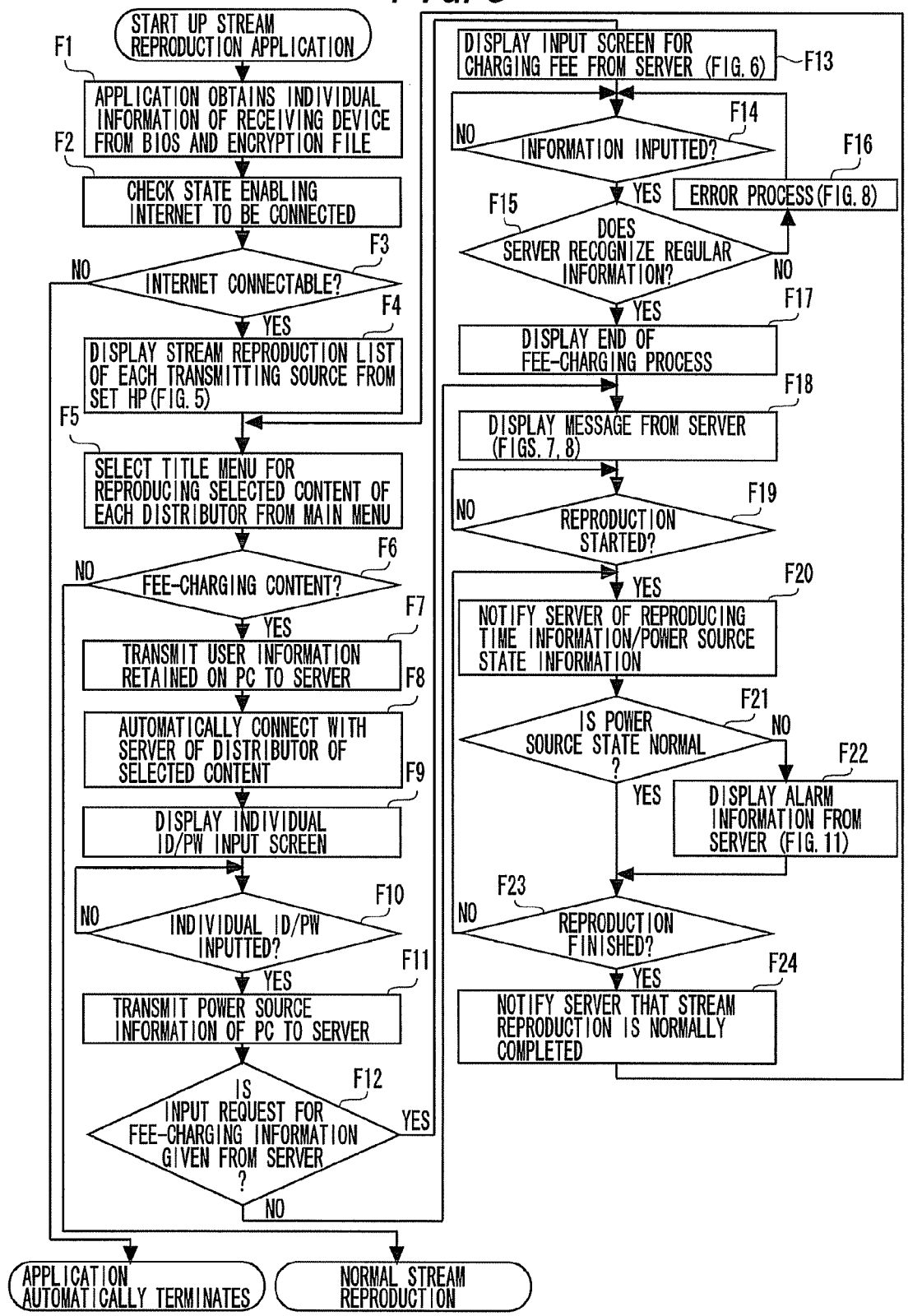
FIG. 3 is a flowchart illustrating a processing flow of a stream receiving process.

A processing example of the information system will hereinafter be discussed with reference to FIGS. 3 through 16. FIG. 3 illustrates a processing flow of a stream receiving process actualized in such a way that the receiving device 1 executes the application program.

The receiving device 1 starts up the application program for executing the stream reproduction. An operation actualized by the CPU 11 executing the application program will hereinafter be described simply as the operation of the receiving device 1. When starting up the application program, the receiving device 1 obtains the information within the BIOS and the information on the hard disk in order to get the server 100 to confirm that the receiving device 1 is the valid product (F1). These items of information are transmitted to the server 100, and the server 100 checks whether the receiving device 1 is the valid product or not.

Figure 9:
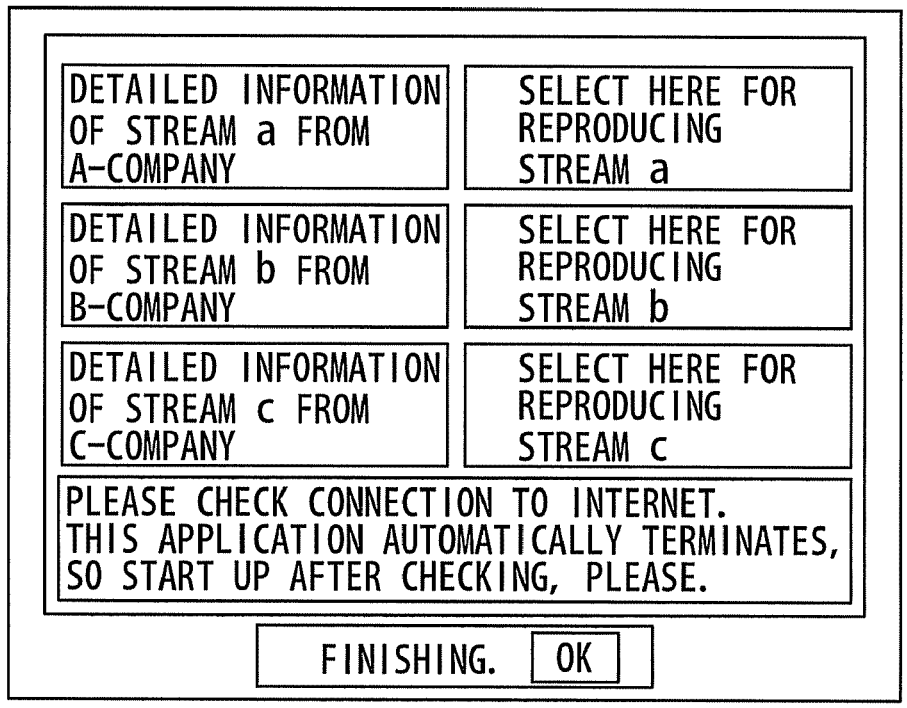
FIG. 9 is a diagram of a screen if unable to connect with the Internet.

Next, the receiving device 1 checks the connectability to the Internet (F2). If unable to connect with the Internet, the receiving device 1 is disabled from executing the stream reproduction. In this case, the receiving device 1 displays an error and terminates the application program (in the case of N in F3). A message displayed in this case is illustrated in FIG. 9.

Figure 5:
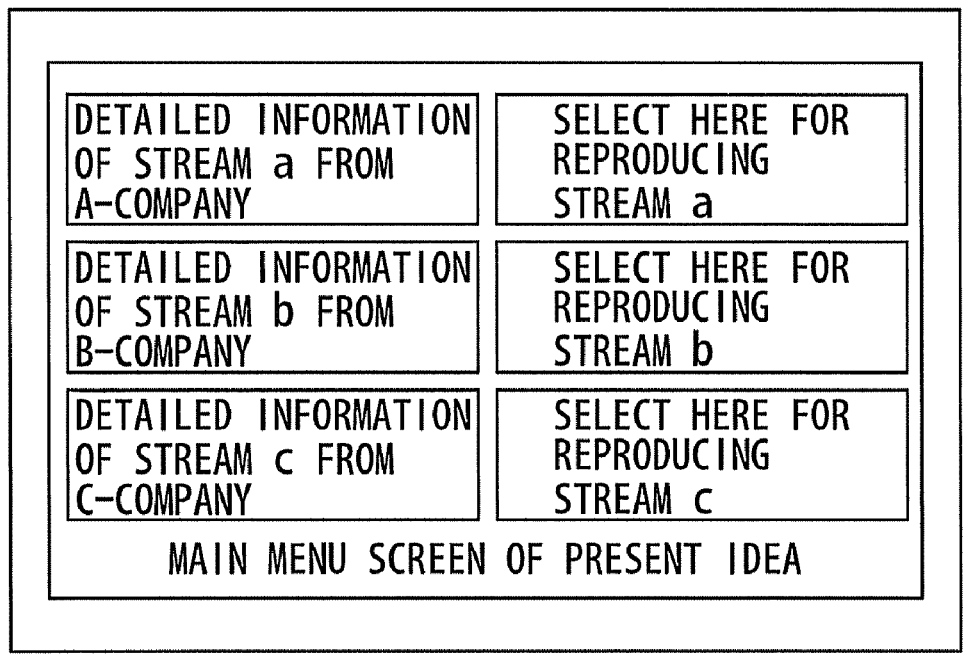
FIG. 5 is a diagram illustrating a display example of a stream content list.

While on the other hand, if determined connectable to the Internet in F2 (in the case of Y in F3), the receiving device 1 displays a list of the stream contents which can be stream-reproduced (F4). The list of the stream contents is written up at the Web site on the Internet. The receiving device 1 previously registers an address of this Web site in the memory 12 (refer to the title list information 61 of the stream reproduction in FIG. 2). FIG. 5 illustrates a display example of the stream content list. As depicted in FIG. 5, the Web site displays push buttons for accessing the detailed information of a plurality of distributors and push buttons for selecting the reception of the contents from the respective distributors. In this case, contents, which are not the fee-charging contents, may also be displayed in the stream content list. If the content other than the fee-charging content is selected, however, this content involves the ordinary stream reproduction but does not entail becoming the processing target content of the present information system.

Such being the case, the receiving device 1 determines, from a user's operation of the pointing device 15 etc in a main menu on the screen of the receiving device 1, whether the fee-charging content is selected or not (F5). Then, if the fee-charging content is not selected (N in F6), the receiving device 1 terminates the process.

Figure 4:
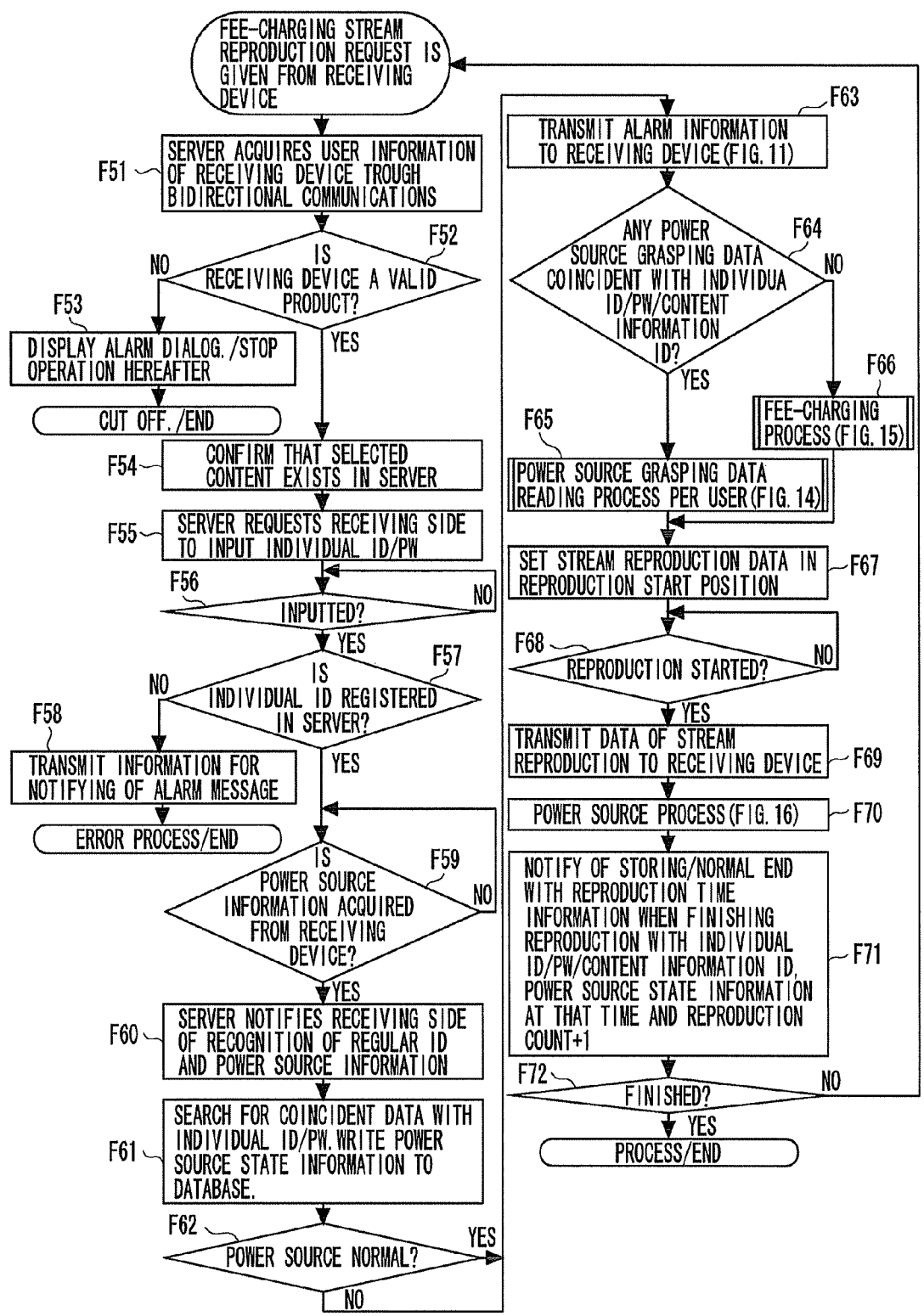
FIG. 4 is a flowchart illustrating a processing flow of a server.

Whereas if the user selects any one of the fee-charging contents (title menu), the receiving device 1 notifies the server 100 of a fee-charging stream reproduction request (see FIG. 4). Upon receiving such a reproduction request, the server 100 acquires the requested fee-charging stream content from a server of the distributor, and stream-distributes the content to the receiving device 1. Note that the fee-charging stream contents may also be stored in the server 100 beforehand.

Moreover, an available scheme is that the server 100 manages the power source state of the receiving device 1 and conducts the fee-charging management thereof, while the server of the distributor actually distributes the contents. In this case, when the receiving device 1 selects the fee-charging content (title menu), it may be sufficient that the receiving device 1 is connected to the Web site of the distributor. Then, the server 100, before starting the distribution of the stream content, grasps the power source state of the receiving device 1, charges the fee for distributing the stream content, and records that the stream content has normally been distributed. Then, the server 100, if it is not recorded that the already-fee-charged stream content has been normally distributed and when the receiving device 1 makes the request for the same content as this stream content next time, does not charge any fee and may request the distributor for the distribution. The process such as this on the side of the server 100 will be separately described in detail.

On the occasion of connecting with the server 100, the receiving device 1, to start with, transmits the user information retained by the receiving device 1 to the server 100 (F7). The user information contains the user ID of the receiving device 1 and the identifying information of the receiving device 1. Herein, the user ID is the identifying information used for the manufacturer/distributor (also called the maker) to identify and manage the user defined as a purchaser of the receiving device 1. The server 100 determines, based on the transmitted user information, whether the receiving device 1 is the valid device or not and the user is the authorized user or not. The identifying information of the receiving device 1 is the information recorded in the ROM 26 stored with the BIOS or in the hard disk.

Then, when the server 100 confirms that the device is valid and the user is authorized, the receiving device 1 is approved to establish the connection to the server 100 (F8). Subsequently, the receiving device 1 displays an individual ID/password input screen of the Web site (F9). Upon completion of inputting the individual ID/password to the Web site (in the case of Y in F10), the receiving device 1 transmits the power source information to the server 100 (F11). The CPU 11 of the receiving device 1, which executes the process in F11, corresponds to unit to notify of a charging state of a secondary battery.

Figure 6:
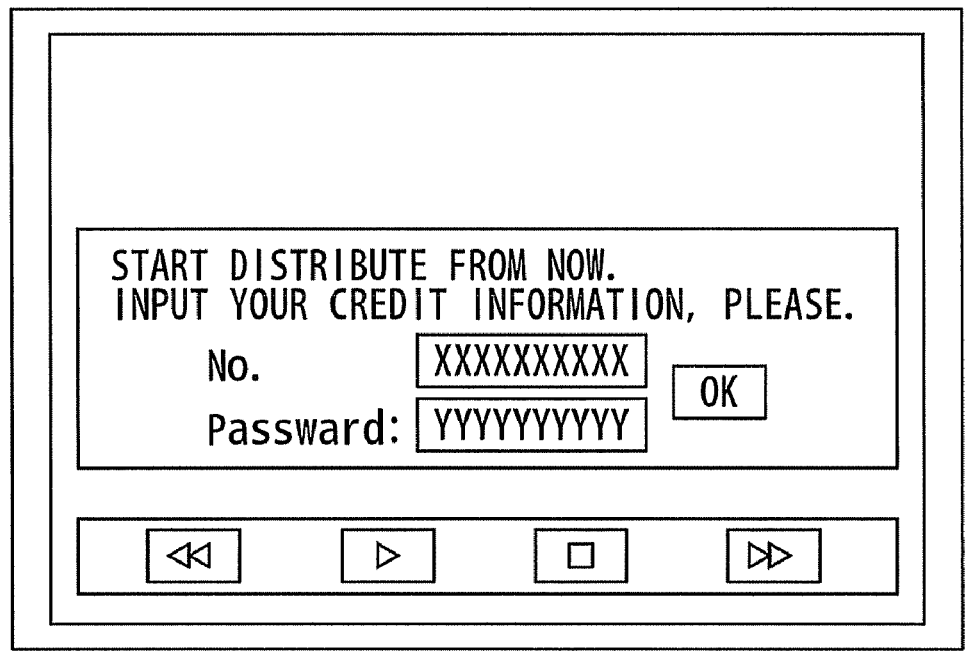
FIG. 6 is a diagram of an example of an input screen for a credit card number and a password.

At this time, the server 100 determines whether or not the fee-charging information of the user has already been registered in the server 100. Then, if the fee-charging information of the user is not yet registered in the server 100, the server 100 makes a request for inputting the fee-charging information. When the fee-charging information input request is transmitted from the server 100 (Y in F12), the receiving device 1 displays a fee-charging input screen (F13). On the fee-charging input screen, for example, the credit card number and the password are requested to be inputted. FIG. 6 depicts an example of the input screen displayed at this time.

Figure 10:
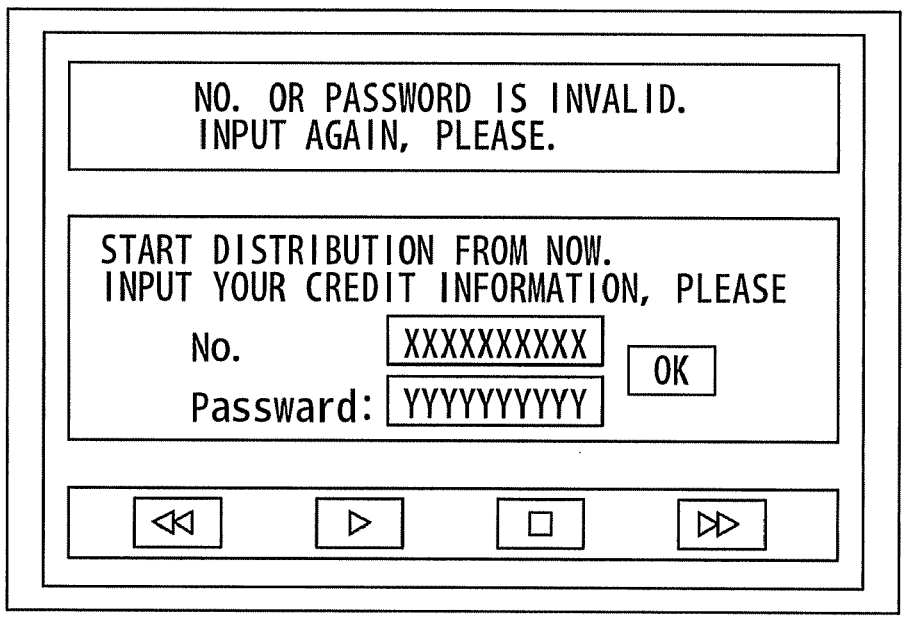
FIG. 10 is a diagram of an example of an error display screen in a case where the inputted credit card number and password are decided to be invalid.

Upon completion of inputting the fee-charging information (in the case of Y in F14), the receiving device 1 receives, from the server 100, a result of the determination about whether the inputted credit card number and password are valid or not. It is determined based on the information in the ID/password database 108 of the user in FIG. 2 whether the credit card number and the password are valid or not. If the result of the determination is that the inputted credit card number and password are invalid (in the case of N in F15), the receiving device 1 executes an error process (of displaying an error screen), and loops the control back to F14. FIG. 10 illustrates an example of the error display screen. As in FIG. 10, the invalidity of the inputted credit card number or password is displayed on the error display screen.

Figure 7:
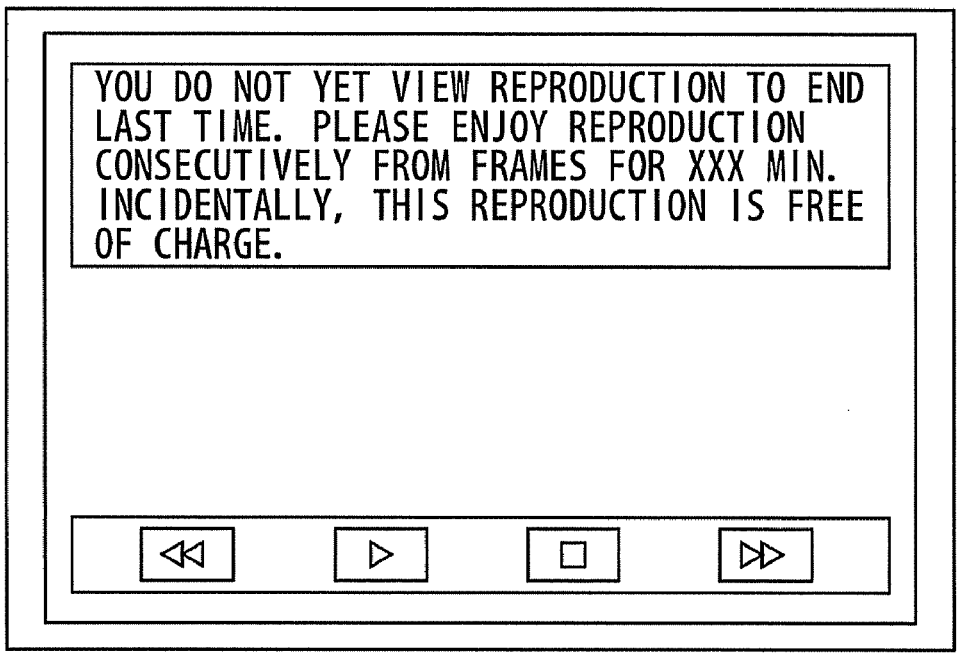
FIG. 7 is a diagram of a message when selecting, if unable to reproduce a content due to deficiency of a charge of a battery during stream reproduction of the content of the last time, this content.
Figure 8:
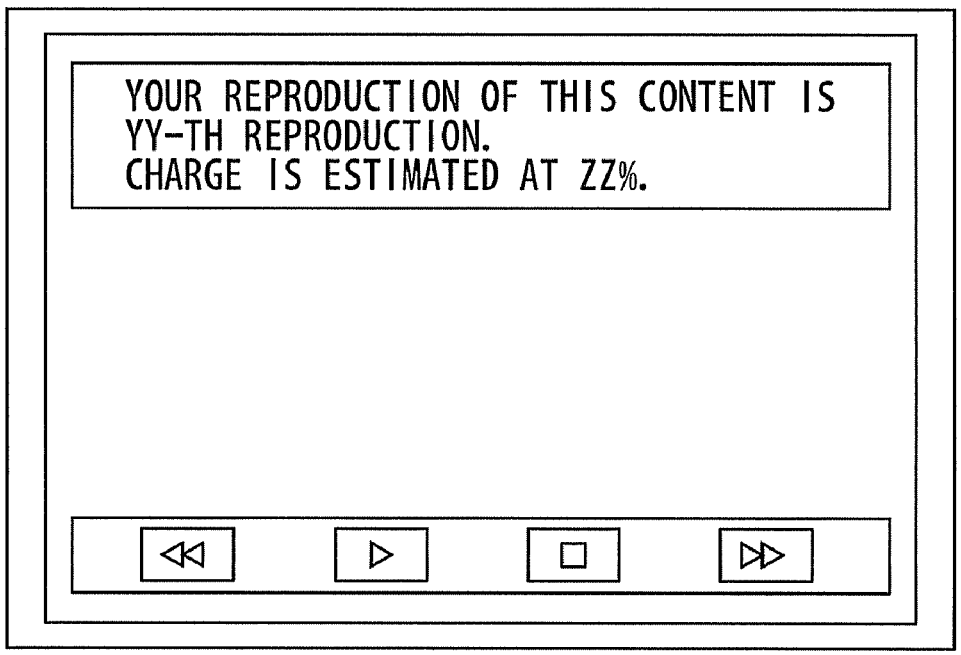
FIG. 8 is a diagram of an example of a message when selecting the content of which the reproduction was normally finished last time in the contents that were stream-reproduced in the past.

If the inputted credit card number and password are determined to be valid (in the case of Y in F15), the receiving device 1 displays an end of the fee-charging process (F17). Further, the receiving device 1 displays a message sent from the server 100 (F18). FIGS. 7 and 8 each illustrate an example of the message displayed at this time. FIG. 7 illustrates, when the content is not reproduced to the end due to deficiency of the charge of the battery during the stream reproduction last time, the example of the message in the case of selecting this content. For example, a message is displayed, which says [You did not yet view the reproduced content to the end in the last reproduction. Please enjoy the remaining part of reproduction for MM minutes (reproduction elapsing time) continuously. Incidentally, this reproduction is free of charge.].

Further, FIG. 8 illustrates an example of a message when selecting the content of which the reproduction was normally finished last time in the contents that were stream-reproduced in the past. For instance, a message is displayed, which says [You reproduce this content, which is the YY-th time. A fee is estimated at ZZ %.]. Namely, it is recognized that the fee is discounted corresponding to the reproduction count. Note that if the determination in F12 is that the fee-charging information input request is not transmitted from the server 100 (in the case of N in F12), the process in F18 is executed.

Then, when the user gives a reproduction start instruction (in the case of Y in F19), the stream reproduction of the selected content is started. At this time, in parallel with the stream reproduction, the receiving device 1 notifies the server 100 of the information representing the present reproducing time and the information representing the power source state (F20). Herein, "the information representing the power source state" is, e.g., a ratio to the terminal voltage or the full charge of the battery. At this time, the server 100 determines whether the power source of the receiving device 1 is normal or not (F21).

Then, if the abnormality is seen in the power source voltage, the receiving device 1 receives the alarm information and displays this alarm information (F22). The "abnormality" implies a case in which the charging state of the battery is lower than the reference level, or alternatively a case in which the continuously-receivable-time estimated from the charging state of the battery is shorter than the time needed for the stream reproduction. Then, the receiving device 1 determines whether the reproduction is finished or not (F23). If the reproduction is not finished, the receiving device 1 loops the control back to F20, and continues the stream reproduction. The CPU 11 of the receiving device 1, which executes the processes in F21-F23, corresponds to unit to receive the information provided continuously for a predetermined period of time.

Then, when finishing the reproduction, the receiving device 1 notifies the server that the stream reproduction has normally been completed (F24). Thereafter, the receiving device 1 loops the control back to F5, then displays the stream content list, and waits for the user's selection.

FIG. 4 illustrates a processing flow of the server 100. As described above, the receiving device 1 accesses the server 100, thereby giving the fee-charging stream reproduction request to the server 100. Then, the server 100 acquires the user information of the receiving device 1 through bidirectional communications via the Internet (F51). Then, the server 100 determines whether the receiving device 1 is the valid product or not (F52). Then, if the receiving device 1 is determined not to be the valid product, the server 100 gets the receiving device 1 to display an alarm dialog (F53). Then, the server 100 stops accepting the subsequent user's operation. Thereafter, the server 100 disconnects the communications with the receiving device 1 and terminates the process.

Furthermore, whereas if the receiving device 1 is determined to be the valid product, the server 100 confirms that the selected content is stored in the server 100 (F54). Then, the server 100 requests the receiving device 1 to input the individual ID and the password. Herein, the individual ID is the information for identifying the user in order to receive the stream reproduction service (F55).

Then, when the individual ID and the password are inputted (in the case of Y in F56), the server 100 determines whether or not the inputted individual ID and password are those registered in server 100 (F57). Subsequently, if it is determined that the inputted individual ID and password are not those registered therein, the server 100 transmits an alarm message to the receiving device 1 (F58). Then, the server 100 disconnects the communications with the receiving device 1 and finishes the process.

Whereas if it is determined that the inputted individual ID and password are those registered therein, the server 100 waits the power source information to be transmitted from the receiving device 1 (F59). The CPU of the server 100, which executes this process, corresponds to receiving unit to receive a charging state of the secondary battery. Then, when the power source information is transmitted from the receiving device 1, the server 100 notifies the receiving device 1 of having recognized the individual ID, the password and the power source information (F60). Further, the server searches the database with the inputted individual ID and password. Then, the server 100 searches the battery residual database 105 on the ID information basis for the data coincident with the individual ID and the password. Subsequently, the power source information is written to the coincident data (F61).

Figure 11:
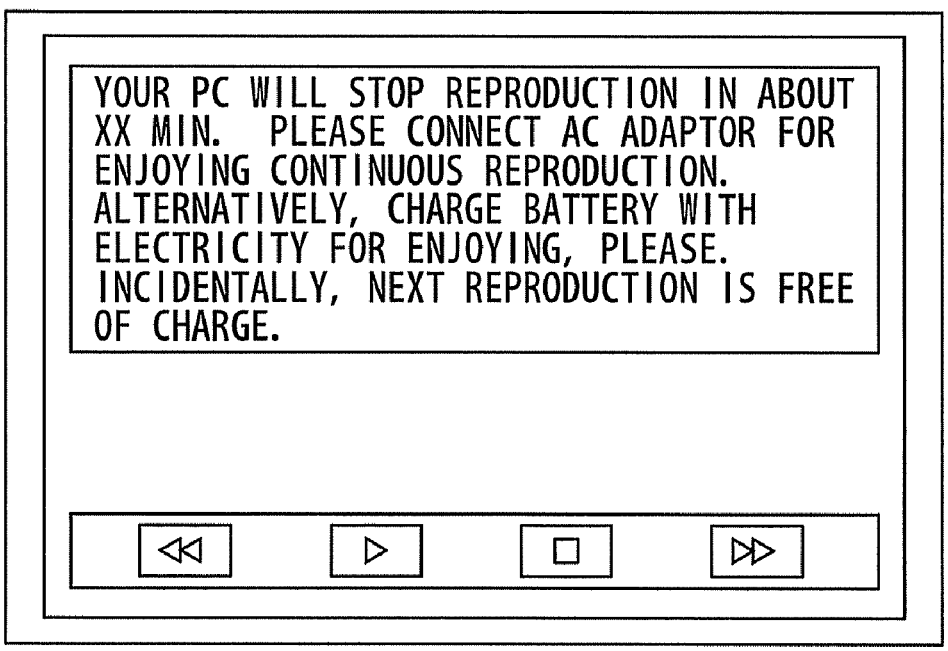
FIG. 11 is a diagram of an example of an alarm when a power source state is determined not to be normal.

Next, the server 100, before transmitting the data of the stream reproduction, determines from the power source information thereof whether the power source state of the receiving device 1 is normal or not (F62). If the power source state of the receiving device 1 is determined not to be normal, the server 100 transmits the alarm information to the receiving device 1 (F63). FIG. 11 illustrates an example of the alarm information thereof. The alarm information contains a message saying, for example, [Your personal computer will stop the reproduction in about MX minutes. If you want to continuously enjoy the reproduction, connect the AC adaptor, please. Alternatively, enjoy after charging the battery, please. Incidentally, the fee is not charged for reproducing the same content next time.].

Next, the server 100 determines whether or not the power source grasping data of the last time, which is specified by the designated user ID information, password and content ID information, is stored in the database (F64). The power source grasping data of the last time is stored in the content/receiving device reproduction start time/reproduction completion (reproducing time) database 109.

FIG. 13 illustrates an example of a data structure of the power source grasping data of the last time of each receiving device 1, which is held by the server 100. As in FIG. 13, the power source grasping data contains the individual ID, the password, the content information ID, the reproducing time, the power source state and a selection count. Accordingly, each piece of power source grasping data is identified by the individual ID/password/content information ID. Each piece of power source grasping data contains the reproducing time information, the power source information and reproduction count information.

Herein, the reproduction time information represents the content reproducing time. Further, the power source information is a battery capacity on the receiving side. For example, when at 100%, this is a case where the AC adaptor is connected. In the case of being driven by the battery, the maximum percentage is 100%, however, this numerical value gradually decreases with the operating time. To give an example, when less than 100%, there might be a case of stopping the power source of the receiving device 1. Such being the case, the server 100 recognizes the power source state "10%" as "LowBatt" (the low voltage state). In the embodiment, the server 100, if in the case of "LowBatt", decides it difficult to perform the normal stream reproduction by now.

Note that the AC adaptor can be presumed to come off when operated with the AC adaptor at the battery capacity "0%" also when changed to 0% from 100% in the case of obtaining the information next time. This may also be recognized as "LowBatt". When the server 100 recognizes "LowBatt", this state may be treated as a stop of the power source.

Namely, the information "LowBatt" being recognized by the server 100 may embrace the recognition that the stream reproduction stops in the middle of the stream reproduction by the receiving device 1 not due to an intentional operation of the operator but for the reason of the power source. Just before the completion of the stream reproduction (e.g., after the stream reproduction will have been finished just when reaching 95% of the whole period of reproducing time), however, it is also assumed that the user might intentionally cut off the power source. In preparation for such a case, a limit point of the remaining time (or a point of time reaching a not-yet-reproduced time ratio) is set up, and, if the power source capacity comes to 0% after this limit point (the point of time reaching this ratio), the operation of the operator is considered intentional, in which the reproduction may be charged with the fee in the case of making again the reproduction request.

If the power source grasping data specified by the designated user ID, password and content ID information exists in the database, the server 100 executes a process of reading the power source grasping data (F65). An in-depth description of the power source grasping data reading process will be given later on according to FIGS. 14A and 14B.

If the power source grasping data specified by the designated user ID, password and content ID information does not exist in the database, this connotes that the user newly selects the content. Therefore, the server 100 executes the fee-charging process (F66). The fee-charging process will be described in detail later on according to FIG. 15. The CPU of the server 100, which executes the fee-charging process, corresponds to fee-charging unit.

Then, the server 100, based on the user's operation on the receiving device 1, sets the stream reproduction data in a reproduction start position (F67). Subsequently, the server 100 waits a reproduction start instruction to be given by the user's operation on the receiving device 1 (F68). When detecting the reproduction start instruction (in the case of Y in F68), the server 100 transmits the data to be stream-reproduced to the receiving device 1 (F69). The CPU of the server 100, which executes this process, corresponds to providing unit to provide the information.

Then, the server 100 executes a power source process (F70). The power source process is defined as a process of checking the power source state of the receiving device 1 in parallel with the stream reproduction during a period till the end of the reproduction. An in-depth description of the power source process will be made according to FIG. 16. The CPU of the server 100, which executes the power source process, corresponds to receiving unit to receive the charging state of the secondary battery.

Then, the server 100, with the individual ID, the password and the content information ID serving as keys, generates the power source grasping data based on the reproducing time information when finishing the reproduction, the power source information and the reproduction count (which is a reproduction count updated once (+1)) at that time, and stores this data in the database. Subsequently, the server 100 notifies the receiving device 1 of being normally finished (F71). At this time, a purport of being normally finished is also recorded in the database (each content/receiving device reproduction start time/reproduction completion (reproducing time) database 109 in FIG. 2). The CPU of the server 100, which executes this process, corresponds to recording unit to record a purport that the receiving device could continue the reception.

Thereafter, the server 100 determines whether an end request is given from the receiving device 1 or not (F72). If the end request is given from the receiving device 1, the server 100 finishes the process. Whereas if a not-end request (continuous request) is given, the server 100 loops the control back to F52 and accepts a next fee-charging stream request.

Figure 15:
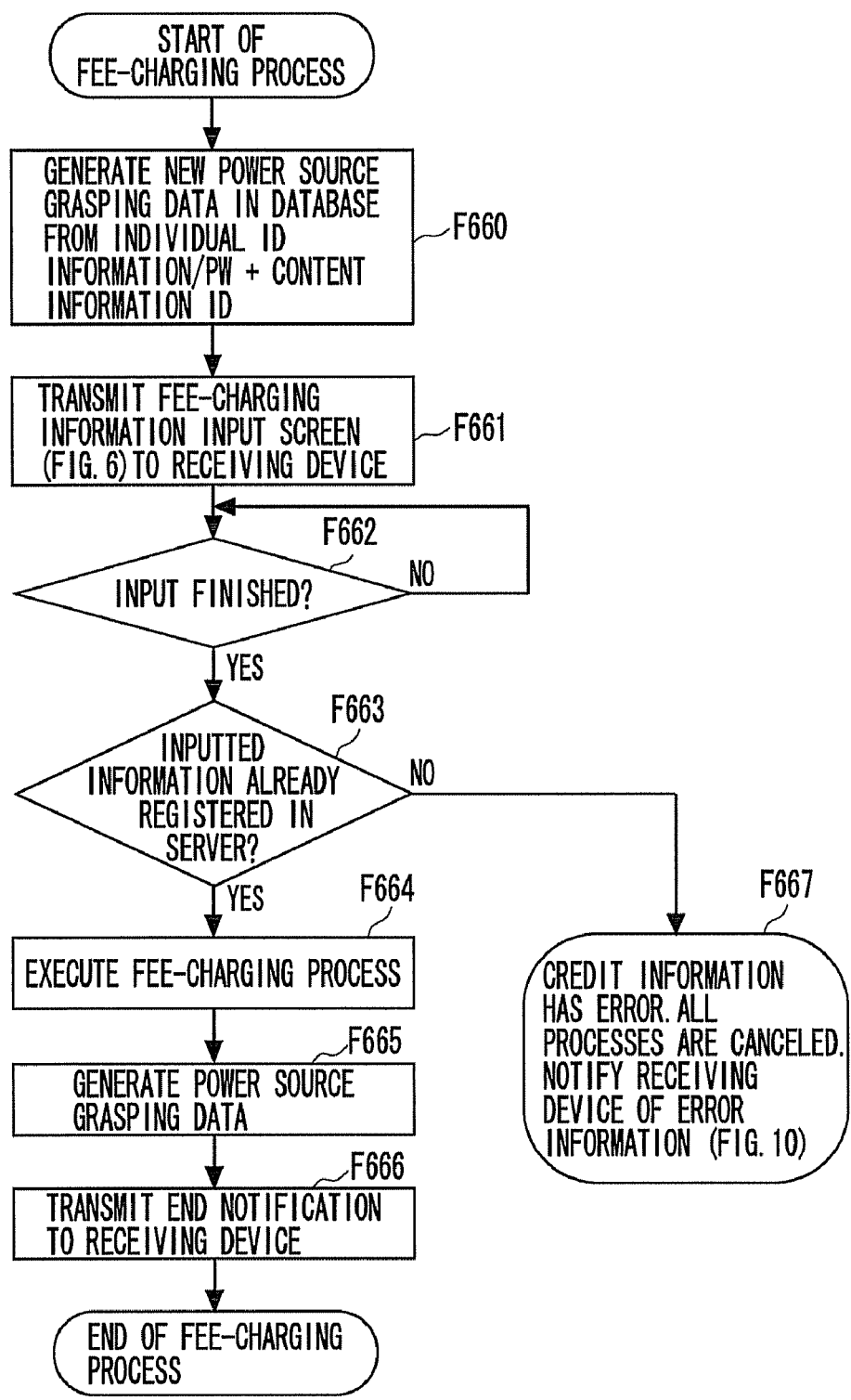
FIG. 15 is a flowchart illustrating details of a fee-charging process.

FIG. 15 illustrates details of the fee-charging process (F66 in FIG. 4). FIG. 6 depicts an example of a screen displayed on the receiving device 1 with respect to the fee-charging process. In this process, with the user ID information, the password and the content ID information serving as the keys, a new piece of power source grasping data is generated in the database (F660).

The server 100 accepts the input of the credit card number and the password through on the screen of the receiving device 1 (F661). FIG. 6 depicts a screen displayed on the receiving device 1 at this time. Upon finishing the input, the server 100 determines whether or not the inputted credit card number and the password are previously registered as the credit information of the user in the server (F663).

If the inputted information has already been registered in the server, the fee-charging process is executed with this credit card number (F664). To be specific, a bill is created with this credit card number and then saved. Further, the server 100, with the individual ID, the password and the content information ID serving as the keys, newly generates the power source grasping data (F665). Moreover, the server 100 transmits a piece of end notification to the receiving device 1 (F666). While on the other hand, if it is determined in F663 that none of the inputted information has already been registered in the server 100, the server 100 decides that the credit information is error information. The server 100 displays an error message on the receiving device 1. FIG. 10 illustrates a display example at that time. The server 100 cancels the stream reproduction process and disconnects the connection to the receiving device 1 (F667).

FIG. 14A illustrates details of the power source grasping data reading process (F65 in FIG. 4). The power source grasping data specified by the designated individual ID, password and content information ID is read from the database (F651). Then, the server 100 checks, based on the readout power source grasping data, the reproducing time when reproduced last time, the power source state and the existence/non-existence of the record about the normal end (F654).

Subsequently, the server 100 determines whether the stream reproduction specified by the individual ID, the password and the content information ID is finished halfway or not (F655). The determination about whether finished halfway or not is made based on the record (based on whether the completion-of-reproduction flag is set ON or not) in each content/receiving device reproduction start time/reproduction completion (reproducing time) database 109. A substitute for determining whether the completion-of-reproduction flag is set ON or not may, however, involve determining whether the reproduction start flag is set OFF or not. Further, the content reproducing time may also be compared with the continuous operating time estimated from the power source information before starting the reproduction. Then, in the record in each content/receiving device reproduction start time/reproduction completion (reproducing time) database 109, if the continuous operating time is shorter than the content reproducing time, it may be decided that the reproduction is not normally finished. Moreover, in the case of acquiring the power source information in parallel with the reproduction, the remaining reproducing time of the content may also be compared with the residual operating time of the power source information. If finished halfway last time, a process for a halfway finish of the last time is executed (F656). This process will be explained later on in FIG. 14B.

Whereas if not finished halfway last time, the server 100 determines whether or not the numerical value of the present power source state is equal to or smaller than a specified value (F657). If the present power source state is equal to or smaller than the specified value, the server 100 obtains the designated content reproducing time from the database (F658). Then, the server 100 recognizes that the whole content can not be reproduced within the reproducing time, i.e., that the content is reproduced till the power source is all consumed (e.g., up to the remaining time of MX min) (F659). Namely, the server 100 recognizes that the continuous operating time estimated from the power source state is shorter than the necessary reproducing time. Then, the server 100 transmits, to the receiving device 1, the information (see FIG. 11) purporting that the content can not be reproduced over the regular reproducing time (F660) Then, the server 100 waits till the reproduction request is received (F665).

While on the other hand, if the numerical value of the present power source state is equal to or larger than the specified value, the server 100 recognizes that the stream reproduction in the regular reproducing time can be done (F662). Then, the server 100 reads, from the database, the fee prescribed based on the data about the content selection count and the reproducing time. The fee may also be, however, obtained from a regular fee and a discount rate in an arithmetic formula. In any case, in the embodiment, the fee for the stream reproduction is discounted according to a past record of the content selection count. Then, the server 100 transmits, to the receiving device 1, the information saying that the reproduction is conducted in the regular reproducing time. FIG. 8 illustrates an example thereof. Then, when the user makes the reproduction request, the server 100 terminates this process and advances the control to F67 in FIG. 4.

Figure 14B:
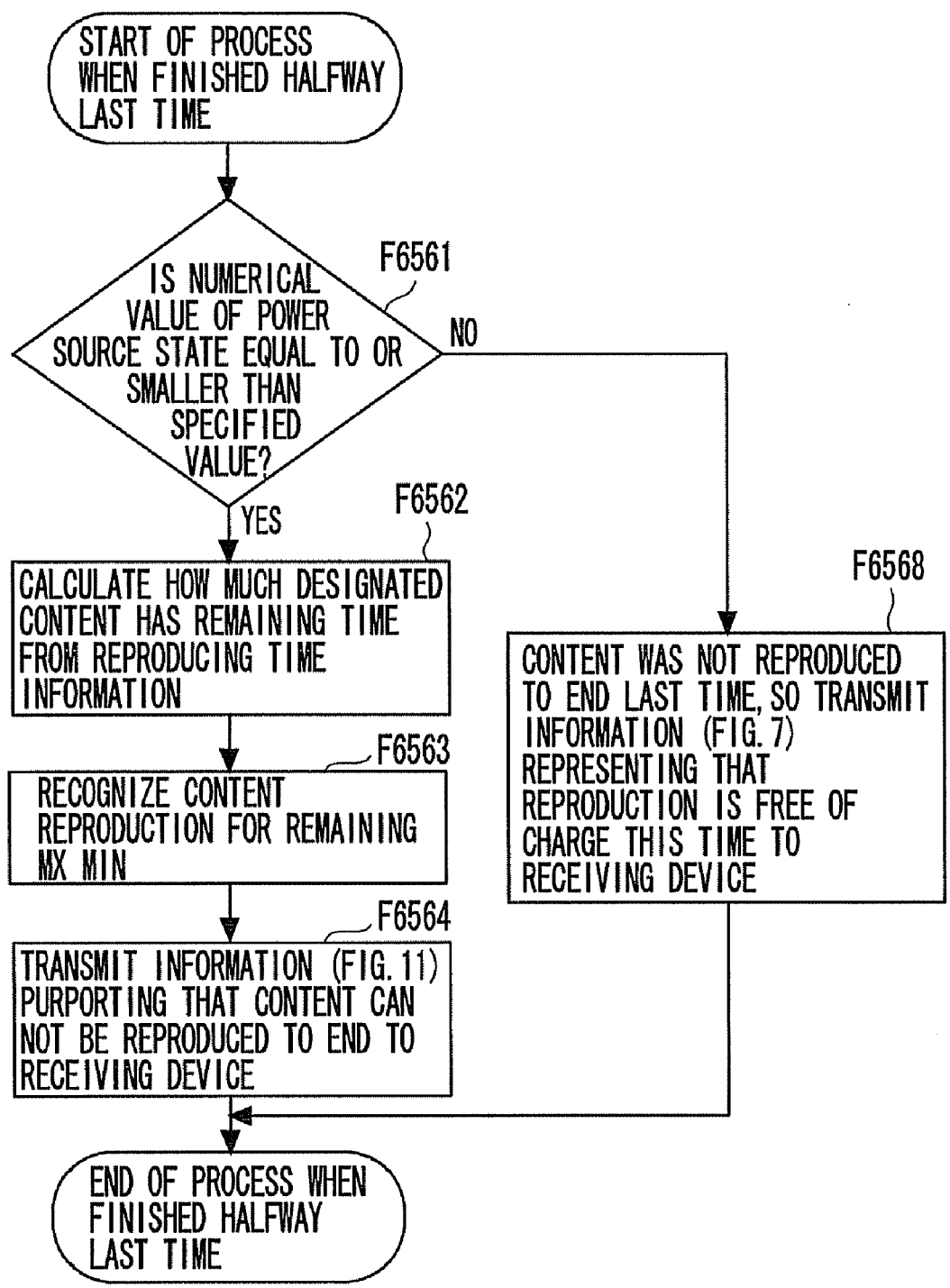
FIG. 14B is a flowchart illustrating details of a process when finished halfway last time.

FIG. 14B illustrates a process conducted when finished halfway last time. In this process, the server 100 determines whether the numerical value of the present power source state is equal to or smaller than the specified value or not (F6561). Then, if the numerical value of the present power source state is equal to or smaller than the specified value or not, the server 100 executes the process in G6562 through F6564. This process is different from the process in FIG. 14A in terms of a point intended for the content that was finished halfway last time, however, the process itself is the same as the process in F658 through F660 in FIG. 14A. Namely, in spite of being finished halfway last time, the server 100, this time also, recognizes that the whole content can not be reproduced within the reproducing time, i.e., that the content is reproduced till the power source is all consumed (e.g., up to the remaining time of MX min) (F6563). Then, the server 100 transmits, to the receiving device 1, the information (see FIG. 11) purporting that the content can not be reproduced over the regular reproducing time (F6564).

Whereas if the numerical value of the power source state is equal to or larger than the specified value, the server 100 did not complete the reproduction to the end last time, and therefore notifies the receiving device 1 of a purport that the reproduction is free of charge this time. FIG. 7 illustrates an example of a screen at this time.

Figure 16:
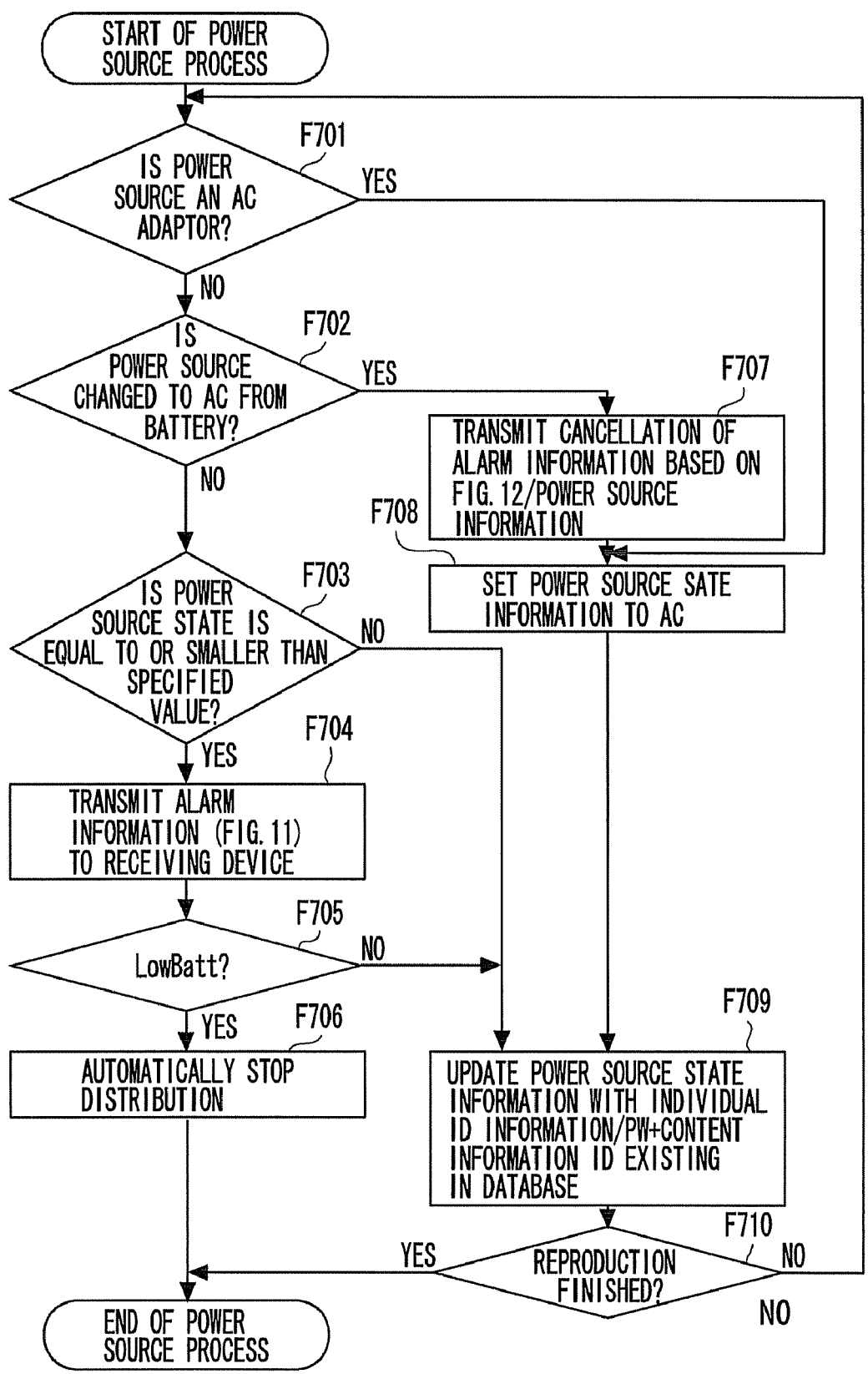
FIG. 16 is a flowchart illustrating details of a power source process.

FIG. 16 illustrates details of the power source process (F70 in FIG. 4). In this process, the server 100 stores and updates, in the database, the power source state and the reproducing time that are periodically acquired from the receiving side in the way of being associated with the individual ID, the password and the content information ID.

To begin with, the server 100 acquires, from the receiving device 1, the information about whether or not the present power source is in the state of being connected to the AC adaptor (F701). If the present power source is in the state of being unconnected to the AC adaptor, the server 100 queries the user about whether the power source is changed to the AC adaptor or not (F702).

Then, in any case, if the power source is not connected to the AC adaptor (in the case of N in both of F701 and F702), the server 100 determines whether or not the power source state (power level) is equal to or smaller than the specified value (F703). Then, if the power source state (power level) is equal to or smaller than the specified value, the server 100 transmits the alarm information to the receiving device 1 (F701). Subsequently, the server 100, when receiving "LowBatt" i.e., the information representing that the voltage is as low as being determined to be impossible of continuation from the receiving device 1, stops distributing the content that is to be stream-reproduced (F706).

While on the other hand, if the power source state (power level) is equal to or larger than the specified value and during a period till the receiving device 1 transmits "LowBatt" to the server 100 when equal to or smaller than the specified value, the server 100 executes the process in F709. Namely, the server 100 updates, based on the present power source state, updates the power source grasping data with the individual ID, the password and the content information ID serving as the keys (F709).

Figure 12:
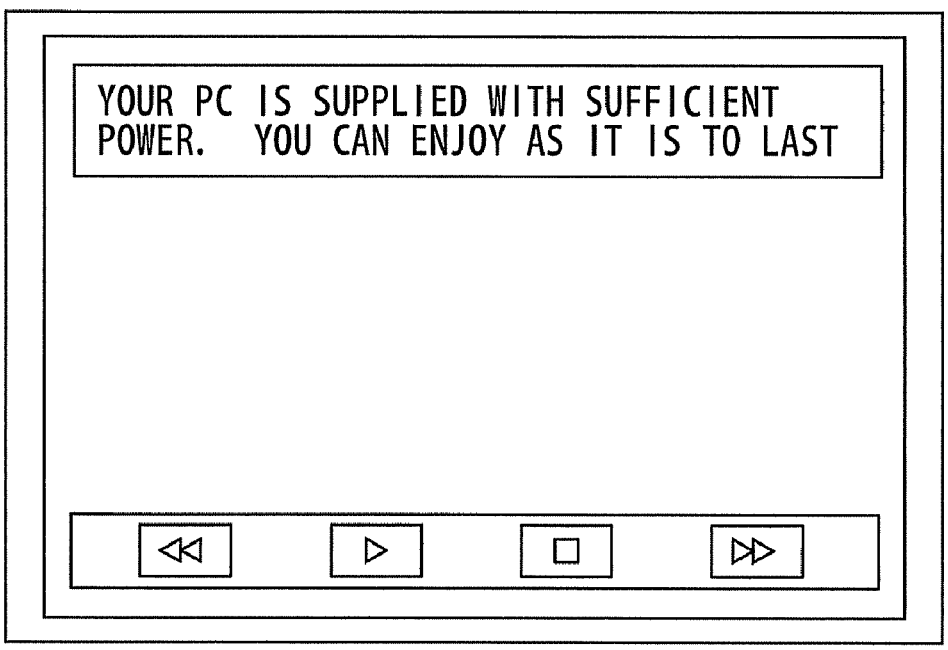
FIG. 12 is a diagram of an example of information representing that the content can be reproduced to the end.

On the other hand, the server 100, when recognizing in the determination in F702 that the power source is changed to the AC adaptor, transmits to the receiving device 1 the information representing that the content can be reproduced to the end (F707). FIG. 12 depicts an example of the screen displayed at that time. Then, the server 100 sets the information that the power source state is AC in the power source grasping data with the individual ID, the password and the content information ID serving as the keys (F708). Subsequently, the server 100 determines whether the reproduction is finished or not (F710). If the reproduction is not finished, the server 100 loops the control back to F701. Thus, the server 100 executes the power source process in parallel with the stream reproduction to the end of the reproduction. Further, also in such a case that the power source state (power level) is equal to or larger than the specified value, the process in F709 is executed.

As discussed above, in the system where the server 100 distributes the content and the receiving device 1 stream-reproduces the content, the battery-operable receiving device 1 transmits the information on the power source state of the receiving device 1 and the content to be reproduced to the server 100 as the transmitting side, and the transmitting side retains this information. Therefore, even when the power source is cut off during the stream reproduction by the receiving device 1, the server 100 can, in the case of reestablishing the connection of the fee-charging content viewed when the power source is cut off and again reproducing this content, determines whether or not the receiving device 1 is charged with the fee. Accordingly, it is feasible to provide the service for which the receiving device 1 is not again charged with the fee in such a situation. Namely, the server 100 can decide from the accurate information whether there is the necessity for recharging the fee or not. Further, for example, a system is not required, which must limitlessly distribute the same content that is distributed with a time limit if again connected. Moreover, the receiving device 1 can view the fee-charging content to the last with no time limit. It is therefore feasible to configure the system providing merits to both of the server 100 transmitting the stream content and the receiving device 1 receiving this stream content.

Note that the processes of the server 100 discussed above are not limited to providing the stream content. Namely, the processes described above can be applied to the general systems which provide the battery-drivable devices with the services continuously for the predetermined period of time.

<<Explanation About Readable-by-Computer Medium>>

Any one of the functions in the embodiment discussed above may be coded and thus stored in a storage area on the readable-by-computer medium. In this case, the program (program includes instructions of Computer) for realizing the function can be provided to the computer or the computer incorporated into the machine or the system via the readable-by-computer medium. The computer or the computer incorporated into the machine or the system reads the program from the storage area on the readable-by-computer medium and executes the program, thereby enabling the function thereof to be realized.

Herein, the readable-by-computer medium connotes a recording medium capable of accumulating information such as the program and the data by electrical, magnetic, optical, chemical, physical or mechanical action, and retaining the information in a readable-by-computer status.

The electrical or magnetic action can be exemplified by writing the data to the element on the ROM [Read Only Memory] constructed by use of a fuse. The magnetic or physical action can be exemplified by a phenomenon of toners to form a latent image on a paper medium. Note that the information recorded on the paper medium can be read, e.g., optically. The optical and chemical action can be exemplified by forming a thin film or a rugged portion on a substrate. Incidentally, the information recorded in the ruggedness-utilized mode can be read, e.g., optically. The chemical action can be exemplified by oxidation-reduction reaction on the substrate or forming an oxide film or a nitride film on a semiconductor substrate, or a photo-resist phenomenon. The physical or mechanical action can be exemplified by forming a rugged portion on an emboss card or forming a punch-hole in the paper medium.

Moreover, in the readable-by-computer mediums, some mediums can be detachably attached to the computer or the computer incorporated into the machine or the system. The attachable/detachable readable-by-computer medium can be exemplified by a DVD (including DVD-R, DVD-RW, DVD-ROM, DVD-RAM), a +R/+WR, a BD (including BD-R, BD-RE, BD-ROM), a CD [Compact Disk] (including CD-R, CD-RW, CD-ROM), an MO [Magneto Optical] disk, other optical disk mediums, a flexible disk (including a floppy disk (Floppy is a trademark of Hitachi Ltd.)), other magnetic disk mediums, a memory card (CompactFlash (trademark of SanDisk Corp. in U.S.A.), SmartMedia (trademark of Toshiba Co., Ltd.), SD card (trademark of SanDisk Corp. in U.S.A., Matsushita Electric Industrial Co., Ltd. and Toshiba Co., Ltd.), Memory Stick (trademark of Sony Corp.), MMC (trademark of Siemens in U.S.A. and SanDisk Corp. in U.S.A.) etc), a magnetic tape and other tape mediums, and a storage device including, as a built-in component, any one of those mediums. Some of the storage devices include a built-in DRAM [Dynamic Random Access Memory] or SRAM [Dynamic Random Access Memory].

Furthermore, some of the readable-by-computer mediums are fixedly installed in the computer or the computer incorporated into the machine or the system. This type of readable-by-computer medium can be exemplified by a hard disk, a DRAM, an SRAM, a ROM, an EEPROM [Electronically Erasable and Programmable Read Only Memory] and a flash memory.

It has been practiced that information is distributed continuously for a predetermined period of time as in the case of stream distribution etc to a multi-function device such as a battery-operable personal computer (which will hereinafter be abbreviated to a PC). The stream distribution is that a server side (which will hereinafter be referred to as a transmitting side) has, e.g., a moving picture content such as pictures in the form of data and distributes the information such as the moving picture content to the PC continuously for the predetermined period of time. The PC side (which will hereinafter be referred to as a receiving side) reproduces the distributed information while receiving the information. This type of reproduction of the moving picture content is called stream reproduction. If the stream reproduction target moving picture content is charged with a fee, a fee-charging process is executed for the stream reproduction (or the stream distribution).

Herein, such a case is assumed that a device performing the stream reproduction is a portable receiving device, e.g., a battery-operable PC, and electric power of the battery of the receiving device is not sufficient. In this case, for example, after executing the fee-charging process, the stream reproduction might stop not due to an intentional operation on the receiving side but due to the deficiency of the power of the battery.

According to the present technology, the system of distributing the information such as the moving picture content continuously for the predetermined period of time can take, in a case where the device on the receiving side is a portable receiving device, compatibility between charging a fee for distributing the information on the transmitting side and receiving the information matching with a cost burdened on the receiving side even when unable to receive all the information continuously due to the power state of the secondary battery of the battery etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information system including a receiving device driven by a secondary battery and a server connected via a network to the receiving device and providing a service to the receiving device, the receiving device comprising:
 a memory of the receiving device; and
 a processor of the receiving device connected to the memory of the receiving device, wherein the processor of the receiving device is configured to operate in accordance with executable instructions that, when executed, cause the processor of the receiving device to perform:
 notifying the server of a charging state of the secondary battery;
 receiving information provided continuously for a predetermined period of time from the server; and
 outputting the information to an output device, the server comprising:
 a memory of the server; and a processor of the server connected to the memory of the server, wherein the processor of the server is configured to operate in accordance with executable instructions that, when executed, cause the processor of the server to perform:

receiving the charging state of the secondary battery from the receiving device;

providing the information continuously for the predetermined period of time to the receiving device;

accumulating fee-charging information for providing the information together with information for identifying the receiving device;

estimating, based on the charging state of the secondary battery, a period of operating time for which the receiving device can operate continuously from a start of receiving the information; and recording information representing that the receiving device can continue the reception for the predetermined period of time, the accumulating includes excluding, from fee-charging target information, information that is provided for a period of non-operating time for which the receiving device is presumed, from at least the charging state, to be disabled from continuing the reception when all of the following conditions are met:

the fee-charging target information was provided to the receiving device in the past;

a piece of information that the receiving device can continue to receive the information for the predetermined period of time is not recorded; and a piece of information that the charging state of the secondary battery is not sufficient for continuing the reception is recorded.

2. A server connected via a network to a receiving device driven by a secondary battery and providing a service to the receiving device, comprising:

a memory; and a processor connected to the memory, wherein the processor is configured to operate in accordance with executable instructions that, when executed, cause the processor to perform:

receiving a charging state of the secondary battery from the receiving device;

providing information continuously for a predetermined period of time to the receiving device;

accumulating fee-charging information for providing the information together with information for identifying the receiving device;

estimating, based on the charging state of the secondary battery, a period of operating time for which the receiving device can operate continuously from a start of receiving the information; and recording information representing that the receiving device can continue the reception for the predetermined period of time, the accumulating includes excluding, from fee-charging target information, information that should be provided for a period of non-operating time for which the receiving device is presumed, from at least the charging state, to be disabled from continuing the reception when all of the following conditions are met:

the fee-charging target information was provided to the receiving device in the past;

a piece of information that the receiving device can continue to receive the information for the predetermined period of time is not recorded; and a piece of information that the charging state of the secondary battery is not sufficient for continuing the reception is recorded.

3. The server according to claim 2, wherein the processor executes receiving, before starting providing the information, the charging state at least once.

4. The server according to claim 2, wherein the processor receives power source state information in the receiving when the receiving device outputs the received information to an output device, and the processor estimates in the estimating, based on the received power source state information, the operating time for which the receiving device can continuously operate in a state specified by the power source state information.

5. The server according to claim 2, wherein the processor executes displaying, when it is determined that the receiving device can not continue the reception during the predetermined period of time due to the secondary battery of the receiving device, an alarm screen for representing this purport on the receiving device.

6. A service providing method comprising:

receiving charging state of a secondary battery from a receiving device;

providing information continuously for a predetermined period of time to the receiving device;

accumulating, by a processor, fee-charging information for providing the information together with information for identifying the receiving device;

estimating, based on the charging state of the secondary battery, a period of operating time for which the receiving device can operate continuously from a start of receiving the information; and recording information representing that the receiving device can continue the reception for the predetermined period of time, the accumulating, by the processor, includes excluding, from fee-charging target information, information that should be provided for a period of non-operating time for which the receiving device is presumed, from at least the charging state, to be disabled from continuing the reception when all of the following conditions are met:

the fee-charging target information was provided to the receiving device in the past;

a piece of information that the receiving device can continue to receive the information for the predetermined period of time is not recorded; and a piece of information that the charging state of the secondary battery is not sufficient for continuing the reception is recorded.

7. The service providing method according to claim 6, wherein the processor executes receiving, before starting providing the information, the charging state at least once.

8. The service providing method according to claim 6, wherein the processor receives power source state information in the receiving when the receiving device outputs the received information to an output device, and the processor estimates in the estimating, based on the received power source state information, the operating time for which the receiving device can continuously operate in a state specified by the power source state information.

9. The service providing method according to claim 6, wherein the processor executes displaying, when it is determined that the receiving device can not continue the reception during the predetermined period of time due to the secondary battery of the receiving device, an alarm screen for representing this purport on the receiving device.

10. A non-transitory computer-readable recording medium that records an executable-by-computer program making a computer connected via a network to a receiving device driven by a secondary battery and providing a service to the receiving device, execute:
- receiving the charging state of the secondary battery from the receiving device;
- providing the information continuously for the predetermined period of time to the receiving device;
- accumulating fee-charging information for providing the information together with information for identifying the receiving device;
- estimating, based on the charging state of the secondary battery, a period of operating time for which the receiving device can operate continuously from a start of receiving the information; and
- recording information representing that the receiving device can continue the reception for the predetermined period of time, the accumulating includes excluding, from a-fee-charging target information, information that should be provided for a period of non-operating time for which the receiving device is presumed, from at least the charging state, to be disabled from continuing the reception when all of the following conditions are met:
- the fee-charging target information was provided to the receiving device in the past;
- a piece of information that the receiving device can continue to receive the information for the predetermined period of time is not recorded; and
- a piece of information that the charging state of the secondary battery is not sufficient for continuing the reception is recorded.

11. The non-transitory computer-readable recording medium that records an executable-by-computer program according to claim 10, wherein computer is made to execute receiving, before starting providing the information, the charging state at least once.

12. The non-transitory computer-readable recording medium that records an executable-by-computer program according to claim 10, wherein computer is made to receive power source state information in the receiving when the receiving device outputs the received information to an output device, and the computer is made to estimate in the estimating, based on the received power source state information, the operating time for which the receiving device can continuously operate in a state specified by the power source state information.

13. The non-transitory computer-readable recording medium that records an executable-by-computer program according to claim 10, wherein computer is made to execute displaying, when it is determined that the receiving device can not continue the reception during the predetermined period of time due to the secondary battery of the receiving device, an alarm screen for representing this purport on the receiving device.

* * * * *

UNITED STATES PATENT AND TRADEMARK OFFICE
CERTIFICATE OF CORRECTION

| | |
|---|---|
| PATENT NO. | : 8,280,759 B2 |
| APPLICATION NO. | : 12/552536 |
| DATED | : October 2, 2012 |
| INVENTOR(S) | : Toshiro Ohbitsu |

It is certified that error appears in the above-identified patent and that said Letters Patent is hereby corrected as shown below:

Title Page, Item (56) (Other Publications); Line 2, Delete "enviroments" and insert -- environments --, therefor.

In the Claims:

Column 21, Line 20, In Claim 10, delete "a-fee" and insert -- fee --, therefor.

Signed and Sealed this
Seventh Day of May, 2013

Teresa Stanek Rea
*Acting Director of the United States Patent and Trademark Office*